United States Patent
Kim et al.

(10) Patent No.: US 9,261,714 B2
(45) Date of Patent: Feb. 16, 2016

(54) PLASMONIC ALL-OPTICAL SWITCH AND LIGHT CONTROL METHOD USING THE SAME

(71) Applicant: KOREA INSTITUTE OF SCIENCE AND TECHNOLOGY, Seoul (KR)

(72) Inventors: Sun Ho Kim, Seoul (KR); Jae Hun Kim, Seoul (KR); Chulki Kim, Samcheok-si (KR); Kyungsun Moon, Seoul (KR); Min Ah Seo, Seoul (KR); Deok Ha Woo, Seoul (KR); Seok Lee, Seoul (KR); Jong Chang Yi, Seoul (KR); Taikjin Lee, Seoul (KR); Youngchul Chung, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 14/533,297

(22) Filed: Nov. 5, 2014

(65) Prior Publication Data

US 2016/0018675 A1    Jan. 21, 2016

(30) Foreign Application Priority Data

Jul. 16, 2014   (KR) ........................ 10-2014-0089684

(51) Int. Cl.
| | |
|---|---|
| G02F 1/03 | (2006.01) |
| G02F 1/01 | (2006.01) |
| G02B 5/00 | (2006.01) |
| G02F 1/00 | (2006.01) |
| B82Y 20/00 | (2011.01) |

(52) U.S. Cl.
CPC .............. *G02F 1/0126* (2013.01); *G02B 5/008* (2013.01); *G02F 1/0009* (2013.01); *B82Y 20/00* (2013.01); *Y10S 977/834* (2013.01)

(58) Field of Classification Search
CPC .............................. B82Y 20/00; G02F 1/0126

USPC ......................................... 359/244; 977/932
See application file for complete search history.

(56) References Cited

U.S. PATENT DOCUMENTS

| 8,111,443 B1 | 2/2012 | Russell et al. |
| 2013/0071083 A1 | 3/2013 | Kim |
| 2015/0122320 A1* | 5/2015 | Wu ................... H01L 21/02376 136/256 |

FOREIGN PATENT DOCUMENTS

| JP | 2006-259064 A | 9/2006 |
| KR | 10-0960938 B1 | 6/2010 |
| KR | 10-1238052 B1 | 2/2013 |
| KR | 10-2013-0031598 A | 3/2013 |
| KR | 10-1287137 B1 | 7/2013 |

OTHER PUBLICATIONS

Sorger, Volker J., et al. "Experimental demonstration of low-loss optical wareguiding at deep sub-wavelength scales." Nature Communications, May 2011, pp. 1-5.

* cited by examiner

*Primary Examiner* — William Choi
(74) *Attorney, Agent, or Firm* — NSIP Law

(57) ABSTRACT

A plasmonic all-optical switch includes a graphene layer, a first dielectric layer located on the graphene layer, a nano-antenna located on the first dielectric layer, and a second dielectric layer located on the nano-antenna. An incident beam is propagated by means of a surface plasmon wave generated at an interface between the graphene layer and the first dielectric layer. Further, localized surface plasmon resonance is selectively generated at an interface between the nano-antenna and the second dielectric layer by means of a pump beam incident to the nano-antenna to decrease an intensity of the incident beam. The plasmonic all-optical switch may operate at an ultrahigh speed just with a small light energy without any electric method, greatly reduce power consumption of an IT device by applying to an all-optical transistor or the like, and increase a processing rate.

9 Claims, 2 Drawing Sheets

PLASMONIC ALL-OPTICAL SWITCH AND LIGHT CONTROL METHOD USING THE SAME

CROSS-REFERENCE TO RELATED APPLICATION

This application claims priority to Korean Patent Application No. 10-2014-0089684, filed on Jul. 16, 2014, and all the benefits accruing therefrom under 35 U.S.C. §119, the contents of which in its entirety are herein incorporated by reference.

BACKGROUND

1. Field

Embodiments relate to a plasmonic all-optical switch, and more particularly, to an all-optical switch for controlling light by using dielectric permittivity which varies depending on the existence of a pump light source, and a light control method using the same.

2. Description of the Related Art

Recently, techniques for dynamically controlling plasmon characteristics of a photoactive material have been developed and played very important roles such as data processing and transmitting and energy harvesting. In most optical devices, the propagation of a surface plasmon wave is determined by a refractive index of a metal surface or a dielectric substance adjacent thereto. If the dielectric permittivity of a dielectric substance can be controlled, it is possible to actively change plasmon characteristics of an entire system and manipulate a light propagation in a metallic nano-structure as desired. Through study activities on this, a new study field "active plasmonics" for controlling a propagation of light in a nano-structure having a size not greater than an optical wavelength has come to the fore.

Various methods have been proposed to control a plasmon mode in a nano optical device, for example a light control method using heat, a light control method using a gate voltage, a light control method using light, or the like. Most studies have used the light control method using a gate voltage. However, even though a surface plasmon electric field is strongly confined to a metal-dielectric interface with a width not greater than a wavelength, due to very weak coupling between the electric field and the light, a very high voltage and a long channel are required for light switching and modulation. Further, devices which have been studied so far have a slow switching time, and thus, are not suitable for the ultrahigh speed information communication era which requires data transmissions of several Gbit/s.

SUMMARY

The present disclosure is directed to providing a plasmonic all-optical switch capable of operating at an ultrahigh speed just with a small light energy and controlling a light by using only a light without using electricity, and a light control method using the same.

According to an embodiment, a plasmonic all-optical switch includes: a graphene layer; a first dielectric layer located on the graphene layer; a nano-antenna located on the first dielectric layer; and a second dielectric layer located on the nano-antenna, wherein an incident beam is propagated by means of a surface plasmon wave generated at an interface between the graphene layer and the first dielectric layer, and wherein localized surface plasmon resonance is selectively generated at an interface between the nano-antenna and the second dielectric layer by means of a pump beam incident to the nano-antenna to decrease an intensity of the incident beam.

The plasmonic all-optical switch may be configured so that dielectric permittivity of the second dielectric layer is changed from a positive value to a negative value at the interface between the nano-antenna and the second dielectric layer by means of the incident pump beam.

An all-optical transistor according to an embodiment includes the plasmonic all-optical switch described above.

According to another embodiment, a light control includes: propagating an incident beam through an interface between a graphene layer and a first dielectric layer by using surface plasmon resonance; and decreasing an intensity of the incident beam by selectively inputting a pump beam to a nano-antenna located on the first dielectric layer to generate localized surface plasmon resonance at an interface between the nano-antenna and a second dielectric layer.

The decreasing of the intensity of the incident beam may include changing dielectric permittivity of the second dielectric layer from a positive value to a negative value at an interface between the nano-antenna and the second dielectric layer by means of the pump beam.

According to an aspect of the present disclosure, the plasmonic all-optical switch and the light control method using the same may solve problems of conventional techniques in relation to the demands on low power consumption and ultrahigh speed, which is essential to the next-generation ultrahigh speed information communication era. The plasmonic all-optical switch and the light control method may control a light by using a light which may operate at an ultrahigh speed just with a small light energy without using an electric method at all. This plasmonic all-optical switch may be used for implementing an all-optical transistor.

Considering that the power consumption of IT equipment occupies about 20% of the industrial power at the present and it is estimated the power consumption will increase over three times 10 years later (Green IT Strategy Report, 2009, the Ministry of Knowledge Economy, Republic of Korea), if the plasmonic all-optical switch of the present disclosure is used, the power consumption of IT equipment will be greatly reduced. In addition, a device adopting the plasmonic all-optical switch same may improve its processing rate and thus may easily process a great amount of data which continuously increasing along with the development of technology.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
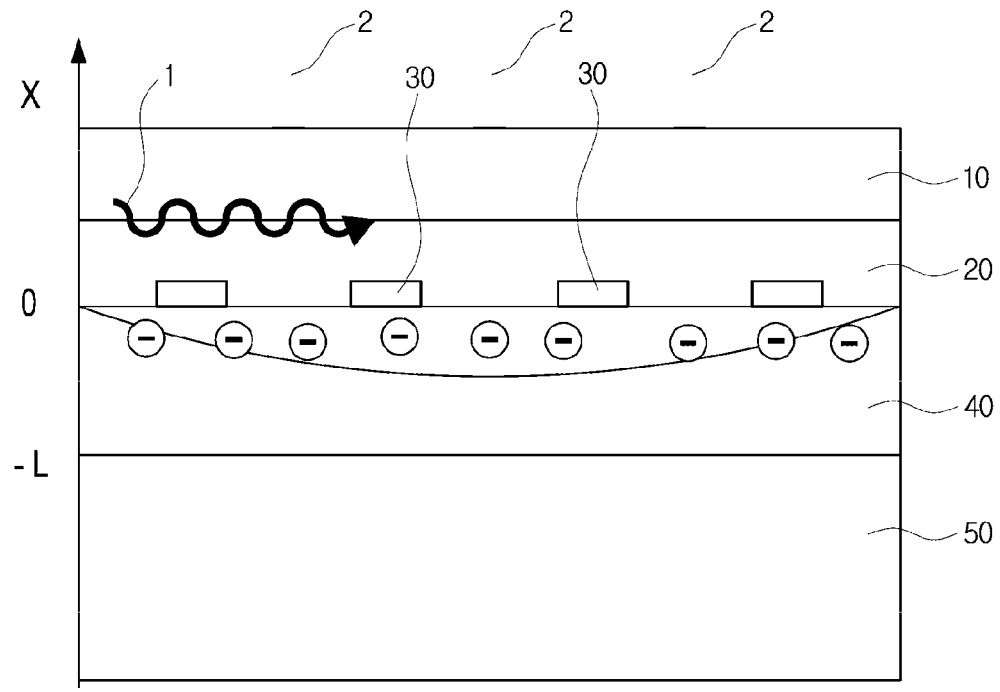
FIG. 1 is a cross-sectional view schematically showing a plasmonic all-optical switch according to an embodiment.

FIG. 1 is a cross-sectional view schematically showing a plasmonic all-optical switch according to an embodiment.

Referring to FIG. 1, the plasmonic all-optical switch of this embodiment may include a graphene layer 10, a first dielectric layer 20, a nano-antenna 30 and a second dielectric layer 40. The graphene layer 10, the first dielectric layer 20, the nano-antenna 30 and the second dielectric layer 40 may be located on a substrate 50. The substrate 50 may be made of silicon (Si) or other suitable materials. The substrate 50 may be made of silicon doped at a relatively lower concentration in comparison to the second dielectric layer 40 adjacent to the substrate 50. As a result, the substrate 50 may function as a cover layer having a higher refractive index in comparison to other layers in the entire device.

The graphene layer 10 is made of graphene or graphene compound. For example, the graphene layer 10 may be made of graphene oxide. The first dielectric layer 20 may be located on the graphene layer 10 and made of dielectric material. Between the graphene layer 10 and the first dielectric layer 20, surface plasmon resonance according to an incident beam 1 may be generated. The surface plasmon resonance refers to a phenomenon in which an amplified field is induced at an interface between metal and dielectric substance when an inherent characteristic of collective electron oscillation at a metal surface of a nano size satisfies a resonance condition with the wavelength of the incident light. If an incident beam 1 satisfying the resonance condition of the surface plasmon resonance is input, the incident beam 1 may be propagated along the surface of the graphene layer 10 in the form of a surface plasmon wave generated at the interface between the graphene layer 10 and the first dielectric layer 20.

In an embodiment, the first dielectric layer 20 may be made of hexagonal boron-nitride (h-BN). Due to excellent electric conductivity of graphene, electronic devices using graphene have been actively developed, but most experiment results have not exhibited dramatic improvement in efficiency, against expectation. This is because silicon oxide ($SiO_2$) generally used in a substrate has many surface impurities due to unsaturated bonds or the like, and graphene composed of a single carbon layer is suffered from rapidly deteriorated carrier mobility due to collisions with such impurities. For example, graphene floating over a substrate has carrier mobility of about $2.3 \times 10^6$ cm$^2$/Vs at the maximum, but graphene formed on a $SiO_2$ substrate by means of chemical vapor deposition (CVD) or the like has lower carrier mobility of about 1000 cm$^2$/Vs.

To solve this problem, in this embodiment, the first dielectric layer 20 made of hexagonal boron-nitride having a planar structure similar to graphene is located on the graphene layer 10. The hexagonal boron-nitride has dielectric permittivity three to four times of the vacuum dielectric permittivity, similar to $SiO_2$, has a lattice constant which is different from that of graphene just by about 1.7%, and has a nonconductor characteristic. In addition, the hexagonal boron-nitride has substantially no surface unsaturated bond and thus the influence of impurities on the graphene may be substantially neglected. For this reason, according to experiment results, the mobility of the hexagonal boron-nitride is similar to that of graphene floating in the air which has the highest mobility.

If air is used as the dielectric substance, an energy loss rate 13 of a surface plasmon wave travelling at the interface between the graphene and the dielectric substance is calculated according to Equation 1 below.

$$\beta = Re[q]/Im[q] = \lambda_{air}/(2\pi C\tau) \quad \text{Equation 1}$$

In Equation 1, $\lambda_{air}$ represents a dielectric constant of the air serving as the dielectric substance, c represents the velocity of light, and $\tau$ represents a mean collision time of the graphene and the dielectric substance. As shown in Equation 1, the energy loss rate of the surface plasmon wave propagating at the interface between the graphene and the dielectric substance is in inverse proportion to the mean collision time. Meanwhile, the mean collision time ti is proportional to a carrier mobility $\mu_e$ of the dielectric substance as shown in Equation 2 below.

$$\tau = h\mu_e\sqrt{\pi n}/(ev_F) \quad \text{Equation 2}$$

In Equation 2, n represents a refractive index of the air, and $v_F$ represents a Fermi velocity. Therefore, if the carrier mobility $\mu_e$ of the dielectric substance is enhanced to a similar level of graphene by using hexagonal boron-nitride as a material of the dielectric substance as in this embodiment, the energy loss rate of the surface plasmon wave may be reduced to about one-several tenth.

Meanwhile, at least one nano-antenna 30 is located on the first dielectric layer 20. As used herein, the nano-antenna 30 refers to a plurality of nano particles made of metallic conductive materials such as gold (Au) or other kinds of conductive materials arranged at intervals. In addition, the second dielectric layer 40 is located at a surface of the first dielectric layer 20 where the nano-antenna 30 is placed. In addition, the second dielectric layer 40 may be made of dielectric material. In an embodiment, the second dielectric layer 40 may include n-doped silicon (n-Si) and/or indium tin oxide (ITO). Between the nano-antenna 30 and the second dielectric layer 40, localized surface plasmon resonance may occur by means of the pump beam 2. The localized surface plasmon resonance between the nano-antenna 30 and the second dielectric layer 40 is used to selectively block the incident beam 1.

If the pump beam 2 is not input to the nano-antenna 30, the incident beam 1 may be propagated in the form of surface plasmon wave between the graphene layer 10 and the first dielectric layer 20 and pass through the plasmonic all-optical switch. Meanwhile, if the pump beam 2 is input to the nano-antenna 30, an electric field is focused at the nano-antenna 30 to generate the localized surface plasmon resonance so that dielectric permittivity of the first dielectric layer 20 and the second dielectric layer 40 changes, which leads to a change of a surface plasmon resonance condition for the propagation of the incident beam 1, thereby decreasing an intensity of the propagated incident beam 1 or blocking the incident beam 1. In other words, the incident beam 1 passing through the plasmonic all-optical switch may be selectively blocked depending on whether the pump beam 2 is incident or not.

Figure 2:
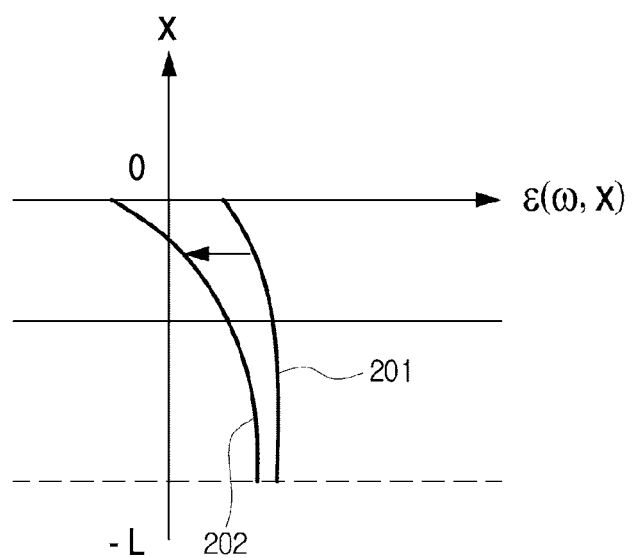
FIG. 2 is a graph showing the change of dielectric permittivity of a dielectric substance due to a pump beam in the plasmonic all-optical switch according to an embodiment.

FIG. 2 is a graph showing the change of dielectric permittivity of the dielectric substance due to the pump beam in the plasmonic all-optical switch according to an embodiment.

Referring to FIGS. 1 and 2, if the pump beam 2 is not input, the dielectric permittivity $\in (\omega, x)$ of the second dielectric layer 40 made of n-Si/ITO is given as a graph 201. In the dielectric permittivity $\in (\omega, x)$, $\omega$ represents a wavelength of light passing through the second dielectric layer 40, x represents a location in an x-axial direction, and the x axis is defined by setting the interface between the nano-antenna 30 and the second dielectric layer 40 as 0 and increasing in a direction toward the first dielectric layer 20 (namely, in an upper direction in FIG. 1).

As shown in FIG. 2, if the pump beam 2 is not input, the dielectric permittivity of the second dielectric layer 40 has a positive value, for example a value slightly greater than 0, at a location of x=0. In order to obtain the above dielectric permittivity of the second dielectric layer 40, the second dielectric layer 40 may be consisted of a degenerate semiconductor which has different charge densities at different locations by using a modulation doping method in which a doping level varies depending on locations. Alternatively, charge distributions of the first dielectric layer 20 and the second dielectric layer 40 may also be changed by applying a voltage between the first dielectric layer 20 and the second dielectric layer 40 to accumulate space charges. By doing so, the dielectric permittivity of the second dielectric layer 40 may be determined to have a value slightly greater than 0 near the point of x=0.

At this time, if the pump beam 2 is input, an electric field is focused at the nano-antenna 30 to generate localized surface plasmon resonance between the nano-antenna 30 and the second dielectric layer 40, and thus electrons are introduced into the second dielectric layer 40. According to experiment results, it has been revealed that the charge density of the second dielectric layer 40 may be changed by about 6.6% by applying a pump beam 2 having an intensity of about 180 pJ per pulse to the nano-antenna 30 made of gold (Au) nano particles and the second dielectric layer 40 made of ITO. The dielectric permittivity of a material having a metallic characteristic such as plasma is determined according to the Drude formula shown in Equation 3 below, and the increase of the charge density n (x) represents a decrease of the dielectric permittivity $\in (\omega, x)$. In Equation 3 below, m represents a mass of material.

$$\varepsilon(\omega, x) = \varepsilon^{(0)} - \frac{4\pi e^2 n(x)}{m\omega(\omega + i/\tau)} \quad \text{Equation 3}$$

According to the above principle, the dielectric permittivity of the second dielectric layer 40 may be decreased as shown in a graph 202 of FIG. 2. At this time, the intensity of the pump beam 2 may be determined so that the dielectric permittivity of the second dielectric layer 40 has a negative value at a location of x=0, namely so that the dielectric permittivity of the second dielectric layer 40 changes across 0 in comparison to the case before the pump beam 2 is input. In this case, the localized surface plasmon resonance condition is met between the nano-antenna 30 and the second dielectric layer 40, and energy of the surface plasmon wave corresponding to the incident beam 1 is absorbed to a local surface plasmon. This is exhibited as an energy loss at the incident beam 1. If the dielectric permittivity of the second dielectric layer 40 has a value near 0 when there is no pump beam 2, the dielectric permittivity of the second dielectric layer 40 may change across 0 at a location of x=0 by applying just a very weak pump beam 2, which realizes optical switching.

Figure 3:
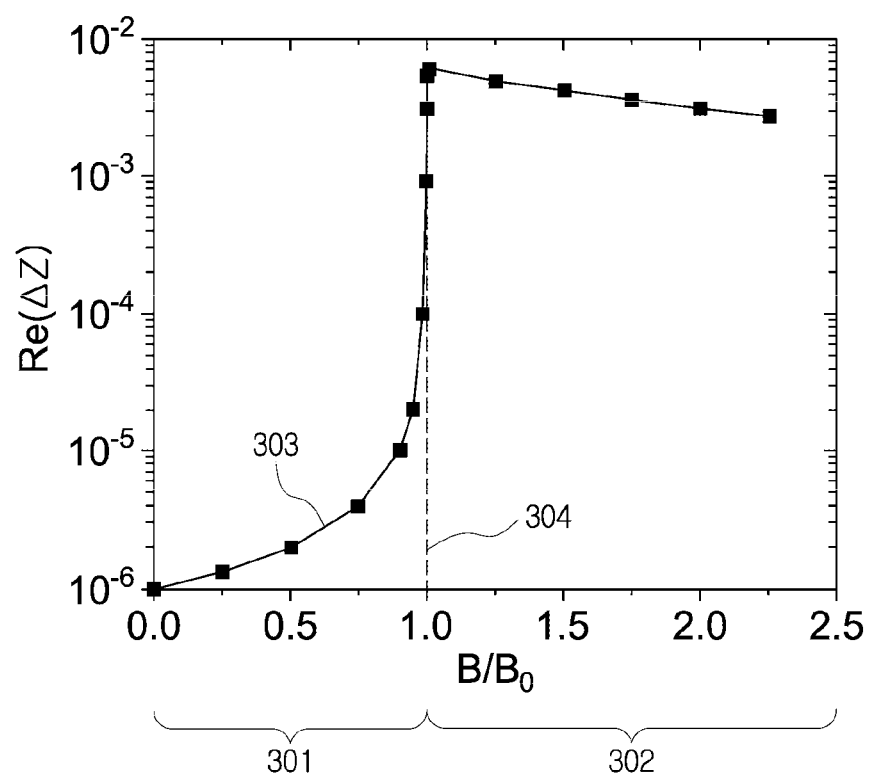
FIG. 3 is a graph showing an energy loss rate of an incident beam due to a pump beam in the plasmonic all-optical switch according to an embodiment.

FIG. 3 is a graph showing an energy loss rate of an incident beam due to a pump beam in the plasmonic all-optical switch according to an embodiment.

A vertical axis of FIG. 3 represents a change of impedance $\Delta Z$, and $B/B_0$ of a horizontal axis represents a slope of dielectric permittivity of the dielectric substance. In addition, in FIG. 3, a region 301 corresponds to a state where the pump beam 2 is not input, and a region 302 corresponds to a state where the pump beam 2 is input. Moreover, a graph 303 shows an actual measurement result, and a graph 304 shows a theoretically calculated result. As shown in FIG. 3, the impedance is very small in a state where the pump beam 2 is not input, but $B/B_0$ increases and the impedance also increases in a state where the pump beam 2 is input. As a result, the surface plasmon is not able to travel to greatly increase a loss rate of the incident beam 1. It may also be found that the actual measurement result has the same tendency as the theoretically calculated value.

Therefore, if the pump beam 2 is not input, the plasmonic all-optical switch of the embodiments comes into an ON state in which the incident beam 1 passes through the plasmonic all-optical switch without any interference. If the pump beam 2 is input, the plasmonic all-optical switch comes into an OFF state in which light cannot pass through the plasmonic all-optical switch as the energy of the incident beam 1 moves to another layer due to the decrease of the dielectric permittivity in the structure. The plasmonic all-optical switch may control whether or not to output the incident beam 1 just by using the pump beam 2 without any electric means, thereby minimizing a power consumption of the device.

The plasmonic all-optical switch of the embodiments may be applied to implement an all-optical transistor. For example, typical p-type all-optical transistor is implemented to come into an ON state when there is no gate voltage and comes into an OFF state when there is a gate voltage. Herein, by using the plasmonic all-optical switch of the embodiments, if the pump beam 2 is not input, the incident beam 1 may pass through the device which comes into an ON state, and if the pump beam 2 is input, the incident beam 1 is blocked which comes into an OFF state, thereby implementing the all-optical transistor.

While the exemplary embodiments have been shown and described, it will be understood by those skilled in the art that various changes in form and details may be made thereto without departing from the spirit and scope of the present disclosure as defined by the appended claims. In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A plasmonic all-optical switch, comprising:
   a graphene layer;
   a first dielectric layer located on the graphene layer;
   a nano-antenna located on the first dielectric layer; and
   a second dielectric layer located on the nano-antenna,
   wherein an incident beam is propagated by means of a surface plasmon wave generated at an interface between the graphene layer and the first dielectric layer, and
   wherein localized surface plasmon resonance is selectively generated at an interface between the nano-antenna and the second dielectric layer by means of a pump beam incident to the nano-antenna to decrease an intensity of the incident beam.

2. The plasmonic all-optical switch according to claim 1, wherein dielectric permittivity of the second dielectric layer is changed from a positive value to a negative value at the interface between the nano-antenna and the second dielectric layer by means of the incident pump beam.

3. The plasmonic all-optical switch according to claim 1, wherein the graphene layer is made of graphene or graphene oxide.

4. The plasmonic all-optical switch according to claim 1, wherein the first dielectric layer is made of hexagonal boron-nitride.

5. The plasmonic all-optical switch according to claim 1, wherein the second dielectric layer includes at least one of doped silicon and indium tin oxide.

6. The plasmonic all-optical switch according to claim 1, further comprising a cover layer located on the second dielectric layer, the cover layer having a refractive index greater than a refractive index of the second dielectric layer.

7. An all-optical transistor comprising a plasmonic all-optical switch according to claim 1.

8. A light control method, comprising:
   propagating an incident beam through an interface between a graphene layer and a first dielectric layer by using surface plasmon resonance; and
   decreasing an intensity of the incident beam by selectively inputting a pump beam to a nano-antenna located on the first dielectric layer to generate localized surface plasmon resonance at an interface between the nano-antenna and a second dielectric layer.

9. The light control method according to claim 8, wherein said decreasing of an intensity of the incident beam includes changing dielectric permittivity of the second dielectric layer from a positive value to a negative value at an interface between the nano-antenna and the second dielectric layer by means of the pump beam.

* * * * *